(12) United States Patent
Srinivasan et al.

(10) Patent No.: US 11,847,030 B2
(45) Date of Patent: Dec. 19, 2023

(54) PRIORITIZING VIRTUAL MACHINES FOR BACKUP PROTECTION AT A VIRTUAL MACHINE DISK LEVEL

(71) Applicant: EMC IP Holding Company LLC, Hopkinton, MA (US)

(72) Inventors: Sharath Talkad Srinivasan, Bengaluru (IN); Smitha Prakash Kalburgi, Banglore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 224 days.

(21) Appl. No.: 16/794,891

(22) Filed: Feb. 19, 2020

(65) Prior Publication Data
US 2021/0255932 A1 Aug. 19, 2021

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 2009/45583* (2013.01); *G06F 2009/45595* (2013.01)

(58) Field of Classification Search
CPC ....... G06F 2009/45595; G06F 11/1464; G06F 2009/45583; G06F 9/45558; G06F 2009/45579; G06F 11/1451; G06F 2201/84; G06F 11/1453

USPC .................................................. 711/162, 161
See application file for complete search history.

(56) References Cited

U.S. PATENT DOCUMENTS

| | | | | |
|---|---|---|---|---|
| 8,566,542 B1 * | 10/2013 | Wang | ................. | G06F 11/1484 711/170 |
| 9,720,783 B1 * | 8/2017 | Kulkarni | ............. | G06F 11/1461 |
| 2003/0126247 A1 * | 7/2003 | Strasser | .............. | G06F 11/1458 709/223 |
| 2010/0049750 A1 * | 2/2010 | Srivastava | .......... | G06F 11/1435 707/E17.005 |
| 2016/0371153 A1 * | 12/2016 | Dornemann | ........ | G06F 11/1458 |

* cited by examiner

*Primary Examiner* — David Yi
*Assistant Examiner* — Zubair Ahmed
(74) *Attorney, Agent, or Firm* — WOMBLE BOND DICKINSON (US) LLP

(57) ABSTRACT

According to one embodiment, a method identifies a plurality of parameters associated with one or more virtual machines to be backed up to a backup storage system and a number of available backup proxy sessions. The method further assigns each of the available backup proxy sessions to a virtual disk of the one or more virtual machines based on the plurality of parameters and the number of available backup proxy sessions. The method then initiates backup operations, wherein each assigned backup proxy session is to back up a corresponding virtual disk to which it is assigned.

20 Claims, 6 Drawing Sheets

PRIORITIZING VIRTUAL MACHINES FOR BACKUP PROTECTION AT A VIRTUAL MACHINE DISK LEVEL

FIELD OF THE INVENTION

Embodiments of the present invention relate generally to data storage systems. More particularly, embodiments of the invention relate to virtual machine (VM) image backup.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). To prevent information loss, VMs are backed up to a separate storage device. A proxy server is used to facilitate data transfer from the physical servers hosting the VMs to the device used for backup storage.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
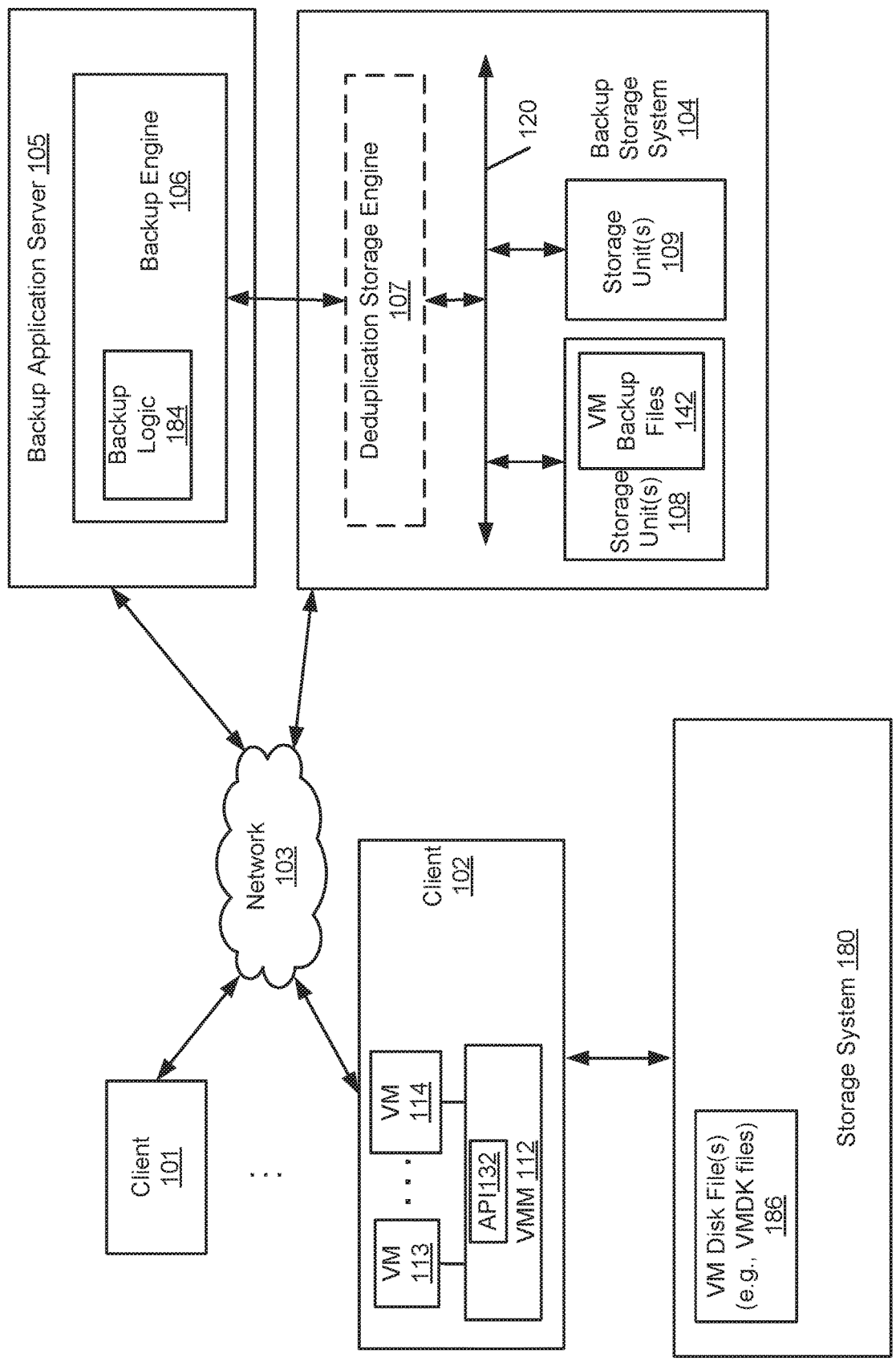
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The deployment of VMs can result in higher server utilization which also means that there are fewer server resources available to perform backup and/or restore. The problem is compounded by the unabated growth in data and applications, which makes it ever more difficult to complete backup and/or restore within the available time window.

One approach to protect data is to back up data at the VM level. Virtualization vendors such as VMware provide a set of application programming interfaces (APIs) for a backup application. One may use a VM API such as VMware's vStorage APIs for Data Protection (VADP) to pull the data out of the virtual infrastructure and onto a backup storage system. This typically requires routing the data through a proxy server.

A proxy server may be a physical or virtual proxy server and may include multiple backup sessions (e.g., a backup process) that can be assigned to back up particular data. Conventionally, the backup sessions are assigned statically at the VM level. This means that a single backup session is assigned to a VM and facilitates backup of all the VM's data. However, VMs can vary widely in the number of virtual machine disks (VMDK), and size of the VMDKs, associated with the VMs. Thus, if extra backup sessions are available after a session is assigned to each VM, then many of the backup sessions may remain idle, resulting in inefficient back up protection. Additionally, even if multiple sessions were to be assigned statically to a VM (e.g., four sessions per VM), in some instances the number of statically assigned sessions for a VM may be larger than the number of VMDKs of the VM. In such a case, the extra sessions remain idle as the VM is backed up. On the other hand, the number of statically assigned sessions may be smaller than the number of VMDKs, in which case the sessions may backup the VMDKs sequentially rather than in parallel. Both of these situations are inefficient, resulting in a larger time required to back up the VM. The current disclosure addresses the above issues of conventional methods by assigning backup proxy sessions dynamically at the VMDK level and prioritizing VM backup based on the assignment of the backup proxy sessions.

According to some embodiments, a backup server identifies parameters associated with virtual machines that are to be backed up to a backup storage system. Backup proxy sessions that are available to back up the virtual machines are identified and the number of available backup proxy sessions determined. Each of the backup proxy sessions can be assigned at a VMDK level (i.e., one session to one VMDK) based on the backup proxy sessions available and the parameters associated with the virtual machines. The backup server initiates performance of backup operations using the assigned backup proxy sessions to backup up corresponding VMDKs to which they are assigned.

In one embodiment, the parameters used to assign the backup proxy sessions include the number of virtual machines to be backed up, the number of VMDKs associated with each of the virtual machines to be backed up, and the size of each of the VMDKs. In one embodiment, assigning the backup proxy sessions to the VMDKs is in response to determining that the number of backup proxy sessions exceeds the number of virtual machines to be backed up (i.e., there will be idle sessions after assigning a single session to each VM). In one embodiment, assigning the available backup proxy sessions includes first assigning available proxy sessions to the virtual machine with the largest number of VMDKs. In one embodiment, assigning the backup proxy sessions includes assigning one portion of the backup proxy sessions to VMDKs of a first VM with the largest number of VMDKs, then assigning a second portion of the sessions to VMDKs of a second VM with the second largest number of VMDKs, and so forth until all sessions are assigned. In one embodiment, the sessions are assigned to VMDKs of a VM in descending order of the size of the VMDKs of the VM. In one embodiment, once a backup proxy session has completed the backup of a VMDK and become idle, the session may be reassigned to another VMDK, according to the above rules.

In one embodiment, a backup server receives a request to backup virtual machines to a backup storage system. The server may identify a number of virtual machines to be backed up as well as a number of available proxy sessions to be used to perform the backup. If the number of backup proxy sessions exceeds the number of virtual machines to be backed up, the backup server may determine a number of extra backup proxy sessions available. The server may then identify the number of VMDKs associated with each VM and assign the extra backup proxy sessions according to the number of VMDKS associated with each VM. In one embodiment, the backup server prioritizes backup of the VMs based on an estimated time required to backup each of the VMs calculated based on the assignment of the backup proxy sessions.

FIG. 1 is a block diagram illustrating a backup process according to one embodiment of the invention. Referring to FIG. 1, system 100 includes, but is not limited to, one or more client systems 101-102 communicatively coupled to backup storage system 104, backup application server 105 and storage system 180 over network 103. Clients 101-102 may be any type of clients such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Backup storage system 104 may include any type of server or cluster of servers. For example, backup storage system 104 may be a storage server used for any of various different purposes, such as to provide multiple users with access to shared data and/or to back up mission critical data. Backup storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Backup storage system 104 may have a distributed architecture, or all of its components may be integrated into a single unit. Backup storage system 104 may be implemented as part of an archive and/or backup storage system such as a de-duplication storage system available from EMC® Corporation of Hopkinton, Massachusetts.

In one embodiment, backup application server 105 includes, but is not limited to, a backup engine 106. Backup application server 105 coordinates with backup storage system 104, storage system 180, and clients 101-102 to run various backup operations. Backup engine 106 may perform both backup and restore functions.

In one embodiment, backup storage system 104 includes, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more Redundant Array of Inexpensive Disks (RAID) volumes. Note that in one embodiment, backup application server 105 and backup storage system 104 are integrated into one single system.

In response to a data file to be stored in storage units 108-109, optional deduplication storage engine 107 is configured to segment the data file into multiple segments according to a variety of segmentation policies or rules. Deduplication storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system 104 as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup data from client systems 101-102 and to store the backed up data in one or more of storage units 108 of backup storage system 104, where the data may be deduplicated by deduplication storage engine 107. Backup engine 106 contains backup logic 184 that manages both backup and restore processes within the storage system. Backup logic 184 may assign available backup proxy sessions to VM and/or individual VMDKs of the VMs to be backed up. The backup logic 184 may assign the backup proxy sessions based on the number of VMDKs associated with each VM and the size of each of the VMDKs. The backup logic 184 may then calculate an estimated time of backup for each VM using the backup proxy assignments and then prioritize backup of the VMs based on the estimated time of backup for each VM.

As shown in FIG. 1, the to-be-backed-up VM 113 resides at client 102. Client 102 includes one or more VMs 113-114 hosted by VMM 112. VMM 112 also includes an application programming interface (API) 132, through which VMM 112 manages VMs 113-114. In one embodiment, the API is a VM API such as VMware's vStorage APIs for Data Protection (VADP). In addition, client 102 is communicatively coupled with storage system 180.

Storage system 180 may include any type of server or cluster of servers. For example, storage system 180 may be a storage server used for any of various different purposes, such as to provide multiple users with access to shared data and/or to back up mission critical data. Storage system 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 180 may be implemented as part of a storage system available from EMC® Corporation of Hopkinton, Massachusetts. Storage system 180 may be the primary storage for client 102 and the VMs executing on client 102. Storage system 180 also contains VM disk files 186 that are the content files of the VMs. Note that a storage system of a client may also be called the primary storage of the client to distinguish the storage from backup storage systems.

A virtual machine (VM) represents a completely isolated operating environment with a dedicated set of virtual resources associated with it. A VM may be installed or launched as a guest operating system (OS) hosted by a host OS or a hypervisor. Typically, a host OS or hypervisor represents a virtual machine monitor (VMM) for managing the hosted VMs. A VM can be any type of VM, such as, for example, hardware emulation, full virtualization, para-virtualization, and operating system-level virtualization VMs. Different VMs hosted by a server may have the same or different privilege levels for accessing different resources. Here VMM 112 manages both VM 113 and VM 114.

In one embodiment, a backup process is initiated with a request to back up a VM. The request may come from a client based on a backup schedule, or it may come from a user directly through a user interface. Backup engine 106 may send out a request to backup with a VM identifier (e.g., VM 113 in one example) to VMM 112, which hosts the to-be-backed-up VM 113. Backup engine 106 directs the request to VMM 112 as backup application server 105 knows VM location information. Backup application server 105 may obtain VM information through various methods. For example, backup application server 105 may synchronize with VMM 112 remotely or by querying VMM 112 for the information associated with VMs 113-114. VMM 112 then establishes a consistent state of VM 113. In one embodiment, VMM 112 establishes the consistent state of VM 113 by taking a VM snapshot. The VM snapshot triggers the creation of one or more snapshots of the content files associated with the VM (e.g. VMDK images) in and/or by storage system 180. Such snapshots are referred to as disk snapshots in this specification. Backup engine 106 remotely identifies, via API 132, the consistent state of VM 113, which includes a list of the disk snapshots created in storage system 180 in one embodiment. Backup engine 106 then requests storage system 180 to send VM disk images associated with the consistent state of the VM to a target backup storage. In one embodiment, the VM disk images are disk snapshots resulting from VM snapshot initiated by VMM 112. Finally, backup logic 184 then identifies the requested VM disk images. In this example, the VM disk images are represented by VM disk file 186. VM disk file 186 may take the format of a virtual machine disk (VMDK) provided by VMware.

Backup logic 184 copies VM disk file 186 associated with VM 113 to backup storage system 104. In one embodiment, the disk snapshots for VM 113 are parsed and metadata in the disk snapshots are interpreted to determine information about the files contained in the disk snapshots. Such information includes file attributes such as file name, access control information, and information about layout of the files within the disk snapshot. The disk snapshots are then saved as VM backup files 142 in storage unit 108. According to one embodiment, the backup content may be further deduplicated into deduplicated segments and the deduplicated segments are then stored in one or more physical disks of the backup storage system. In one embodiment, backup storage system 104 remotely requests VMM 112 to delete the VM snapshot taken of VM 113, which causes the corresponding disk snapshots of VM 113 to be deleted. Note that in one embodiment, the target backup storage system 104 may be proxy server. In one embodiment, a proxy server is utilized when storage system 180 and backup storage system 104 are not compatible.

Figure 2:
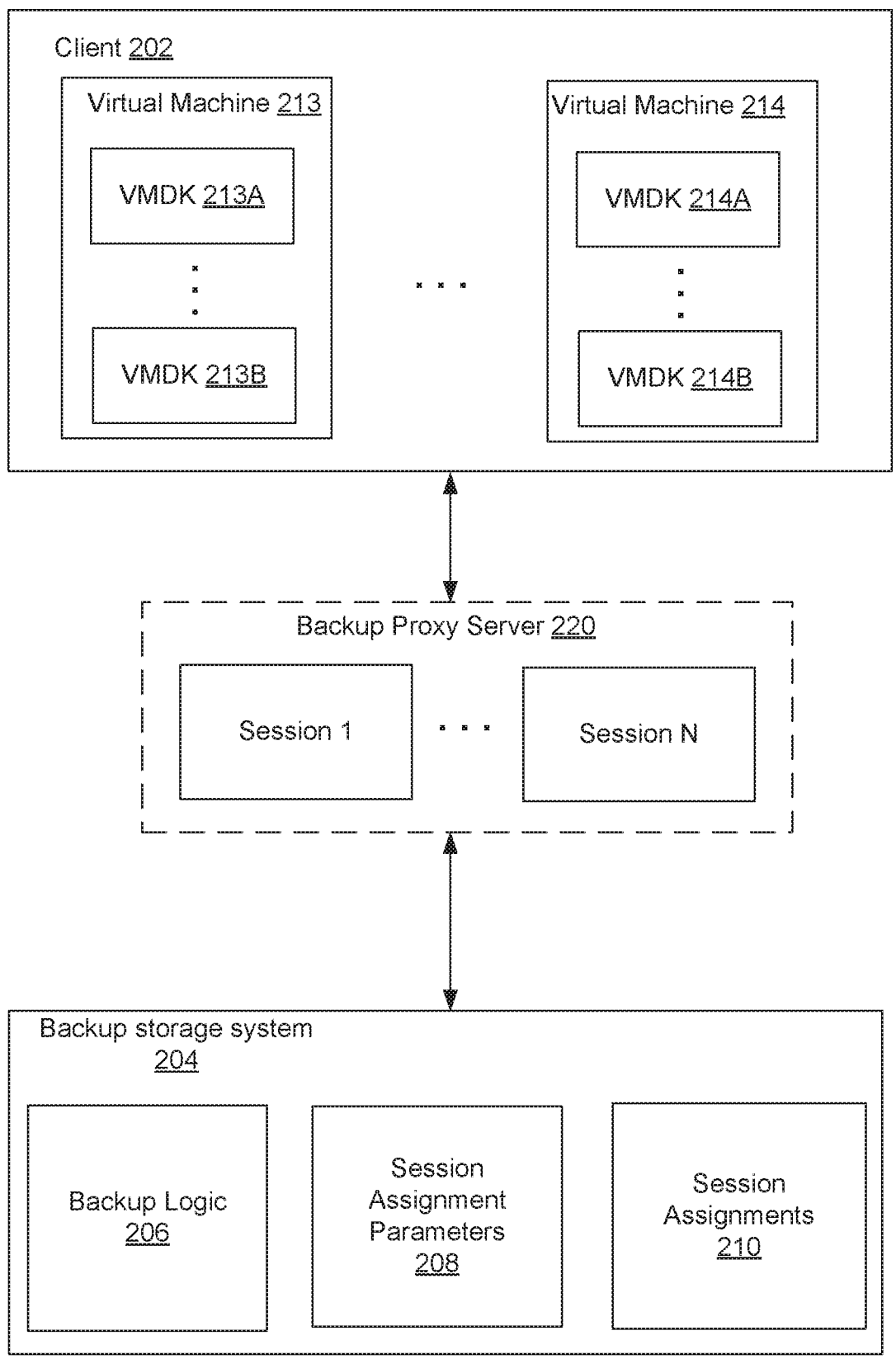
FIG. 2 is a block diagram illustrating a system for virtual machine backup according to one embodiment.

FIG. 2 is a block diagram illustrating a system to backup virtual machines at a VMDK level. The system 200 includes a client 202, a backup storage system 204, and a backup proxy server 220 to establish a connection between the client 202 and the backup storage system 204. The client 202 may be the same as, or similar to, client 102 described with respect to FIG. 1. The backup storage system 204 may be the same as, or similar to, the combination of backup storage system 104 and the backup application server 105, described with respect to FIG. 1. One or more VMs 213-214 may run on the client 202. Although not depicted, the VMs 213-214 may be managed by a virtual machine manager (VMM) or hypervisor. The backup proxy server 220 may have available a plurality of backup proxy sessions (e.g., sessions 1-N) that may be assigned to VMs 213-214 for performance of a backup operation. Particularly, in one embodiment, the sessions 1-N may be assigned to individual VMDKs (e.g., 213A-213B and 214A-214B) of the VMs 213-214. Accordingly, each session can be assigned to, and backup, a single VMDK at a time.

The backup storage system 204, may include backup logic 206, session assignment parameters 208, and session assignments 210. The backup logic 206 may use the session assignment parameters and the sessions of the backup proxy server 220 to generate session assignments 210 mapping each of the sessions 1-N to a particular VMDK of the VMs 213-214. The session assignment parameters 208 may include the number of VMs to be backed up, the number of VMDKs associated with each of the VMs, and the size of each of the VMDKs. The session assignment parameters 208 can include any number of additional VM or VMDK parameters.

More specifically, the backup logic 206 may determine whether there are more backup proxy sessions than VMs that are to be backed up. If there are more backup proxy sessions than VMs 213 (i.e., extra sessions) then the backup logic 206 can assign one proxy session to each VM 213-214 and then assign each of the extra backup sessions to one of the VMDKs of the VMs 213-214. In particular, the backup logic 206 may generate a list of the VMs in descending order of the number of VMDKs associated with the VMs (i.e., from the VM with the largest number of VMDKs to the VM with the smallest number of VMDKs). The backup logic 206 may then assign a session to a VMDK of the VM with the largest number of associated VMDKs. In one embodiment, the backup logic 206 assigns the sessions in order from the largest VMDK to the smallest VMDK of the VM with the largest number of VMDKs. Once the backup logic 206 has assigned a session to each VMDK of the first VM in the list, the backup logic 206 may then continue to the second VM in the list and so forth. The backup logic 206 can store all of the mappings of assigned sessions in the session assignments 210 on the backup storage system 204.

Figures 3A, 3B, 3C:
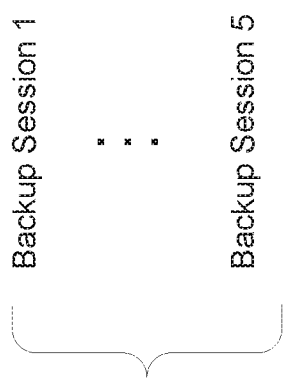
FIG. 3A is a table illustrating an example of virtual machines and virtual machine disk sizes according to one embodiment.
FIG. 3B is a diagram illustrating sessions of a backup proxy server according to one embodiment.
FIG. 3C is a table illustrating assignment of backup proxy sessions at the virtual machine disk level according to one embodiment.

Upon initiation of the backup operation, the backup logic 206 can use the session assignments 210, along with additional parameters, such as network speed, to calculate an estimated time associated with the backup of each VM 213-214. The backup logic 206 can then use the estimated VM backup times to prioritize backup of the VMs 213-214. For example, the VMs that are estimated to take the least amount of time to backup may be backed up prior to VMs that will take a larger amount of time. Alternatively, the VMs that are estimated to take the largest amount of time to backup may be backed up prior to VMs that will take a lesser amount of time FIGS. 3A, 3B, and 3C illustrate an example assignment of backup proxy sessions at a VMDK level. FIG. 3A depicts a table of VMs, the VMDKs associated with each VM, and the size of the VMDKs. FIG. 3B depicts a backup proxy server with a series of available backup proxy sessions 1-N, similar to FIG. 2. FIG. 3C depicts example assignments of the backup proxy sessions to the corresponding VMDKs to be backed up.

Referring to FIG. 3A, the table depicted includes three VMs (VM 310, VM 320, and VM 330). VM 310 has three VMDKs associated with it (VMDK 315A-C), VM 320 has five associated VMDKs (VMDK 325A-E), and VM 330 has a single VMDK (VMDK 335A). As can be seen in FIG. 3A, each VMDK has a size associated with it, indicating the amount of physical storage space occupied by the VMDK. Referring to FIG. 3B, the backup proxy server 350 includes backup sessions 1-5, each of which can be assigned to a VMDK listed in the second column of FIG. 3A. Referring to FIG. 3C, each of the five backup proxy sessions have been assigned to one of the VMDKs listed. The logic used to assign each of the five proxy sessions 1-5 to a particular VMDK is described below.

In one example, a backup storage server may receive an indication that VMs 310, 320 and 330 are to be backed up to a backup storage system (e.g., backup storage system 104). In one embodiment, backup logic of the backup storage system determines that the number of VMs to be backed up is three and that the number of backup sessions is 5 (e.g., sessions 1-5). Because the number of backup sessions is larger than the number of VMs, the backup logic determines to assign the sessions at the VMDK level. In one embodiment, backup logic first assigns a single backup session to each of the VMs. For example, the first VMDK of each of the VMs (e.g., VMDK 315A, 325A, and VMDK 335A) are each assigned a backup session, as depicted. The backup logic may generate a list of the VMs with at least one VMDK remaining without an assigned backup proxy session (i.e., 310 and 320). In one embodiment, the backup logic generates the list of VMs prior to assigning a session to each VM. In another embodiment, the list is generated after the assignment of a session to each VM. The remaining VMs in the list may be arranged in descending order from the VM with the most VMDKs to the VM with the fewest VMDKs. Thus, in the present example, VM 320 is first in the list and VM 310 is second in the list. The backup logic may then list the VMDKs for each VM (VM 310 and VM 320) that have yet to be assigned a backup proxy session. Each list of VMDKs may be arranged in order from the largest to smallest VMDK. Thus, VM 320 will have an associated list as follows: VMDK 325E (40 GB), VMDK 325D (30 GB), VMDK 325B (25 GB), and VMDK 325C (20 GB). VM 310 will have an associated list as follows: VMDK 315B (25 GB) and VMDK 315C (20 GB). In one embodiment, the backup logic may then assign the next remaining session to the largest VMDK of the VM with the most VMDKs. As depicted in the present example, the backup logic may assign session 4 to VMDK 325E (the largest VMDK of the VM with the most VMDKs). The last remaining session (session 5) may then be assigned to the next largest VMDK of VM 320 (VMDK 325D).

In another embodiment, rather than assigning all the sessions to the VMDKs of the VM with the most VMDKs, the backup logic may assign an additional session to each of the VMs with a VMDK yet to be assigned a session. For example, the backup logic may assign the fourth session to VM Disk 325E as done above, but then assign the fifth session to VMDK 315B (the largest VMDK of VM 310).

In another embodiment, the backup logic may assign the sessions strictly based on the sizes of the VMDKs of all VMs. For example, rather than assigning a session to each of the VMs first, the backup logic may assign the backup sessions to the largest five VMDKs of the VMs to be backed up. In another embodiment, the backup logic may combine the above approaches. For example, the backup logic may iteratively assign a session to the largest VMDK of each VM to be backed up until all sessions have been assigned.

Figure 4:
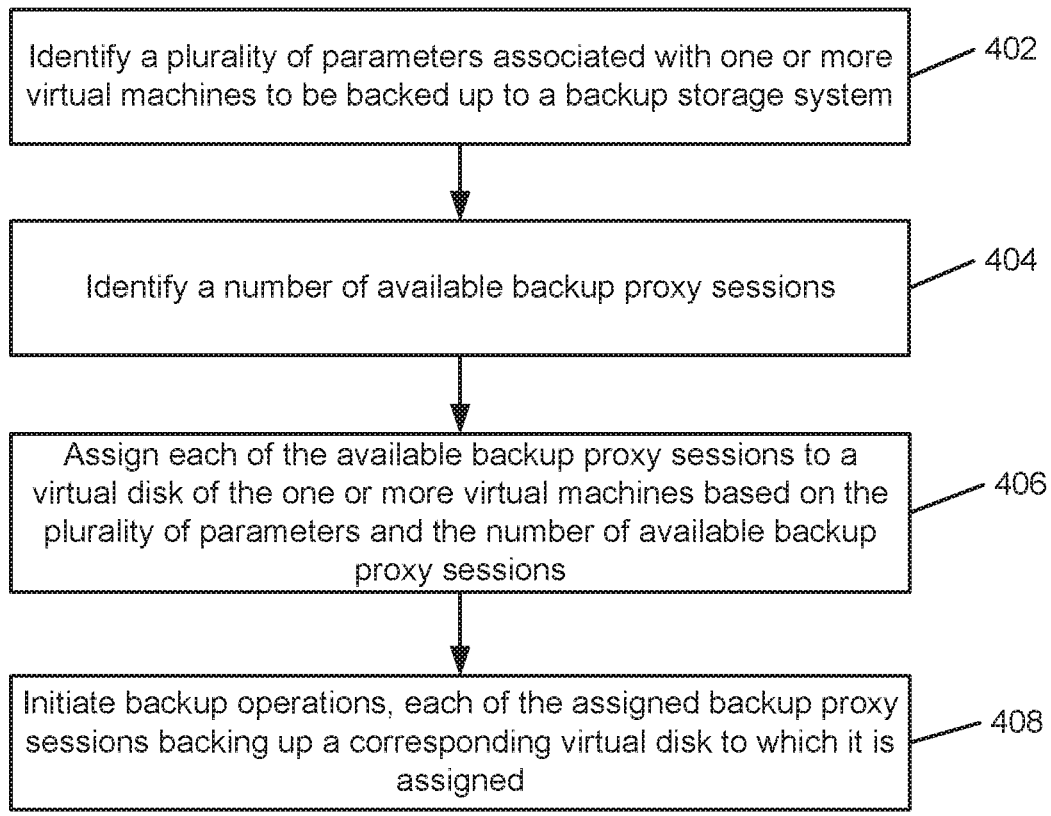
FIG. 4 is a flow diagram illustrating a method for backup according to one embodiment.

FIG. 4 is a flow diagram illustrating a data backup process according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by backup engine 106 of FIG. 1, backup logic 184, and/or backup logic 206 of FIG. 2. Referring to FIG. 4, processing logic, at block 402, identifies a plurality of parameters associated with one or more VMs to be backed up to a backup storage system. The parameters may include the number of VMs that are to be backed up and the number of VMDKs associated with each of the VMs. The parameters may also include the size of each of the VMDKs of the VMs.

At block 404, processing logic identifies a number of available backup proxy sessions. A backup system may include multiple backup proxy servers (either physical or virtual). Each of the backup proxy servers may support a specified number of backup proxy sessions. A backup proxy session may be a process used to facilitate backup of data. The backup proxy session may be assigned to particular data, such as a VM, a VMDK, a file, a volume, etc. A backup proxy session may establish a connection between a backup storage system and the particular data to be backed up and then may facilitate the transfer of the data to the backup storage system.

At block 406, processing logic assigns each of the available backup proxy sessions to a virtual disk of the one or more VMs based on the plurality of parameters and the number of available backup proxy sessions. In one embodiment, the processing logic may generate a list of VMs that are to be backed up. The list may be arranged in descending order according to the number of VMDKs associated with each VM. The processing logic may also generate a list of the VMDKs of each VM arranged in descending order of VMDK size. In one embodiment, the processing logic may assign the backup proxy sessions to the VMDKs according to the list of VMs and the lists of VMDKs. In one embodiment, the processing logic may assign a single session to each of the VMs and then assign any remaining sessions iteratively to the largest VMDK of the VM with the largest number of VMDKs. In another embodiment, the processing logic may assign the sessions based on VMDK size from largest to smallest. In another embodiment, the processing logic may iteratively assign a session to the largest VMDK of each VM until no more session remain. The processing logic may additionally assign the sessions based on the number of VMs, VMDKs, and VMDK sizes in any order or arrangement.

At block 408, processing logic initiates backup operations, wherein each of the assigned backup proxy sessions are to back up a corresponding virtual disk to which it is assigned. In one example, the processing logic calculates an estimated time of backup for each of the VMs based on the assignment of the backup proxy sessions. The processing logic can then prioritize the VMs (e.g., initiate backup of certain VMs first) according to the calculated time for backup of the VMs. For example, the processing logic may initiate backup of the VMs with the largest estimated backup time first. Alternatively, the processing logic may initiate backup of the VMs with the smallest estimated backup time first. In one embodiment, the processing logic may prioritize VMs based on the estimated time in addition to other parameters (e.g., importance, user selection, etc.)

Figure 5:
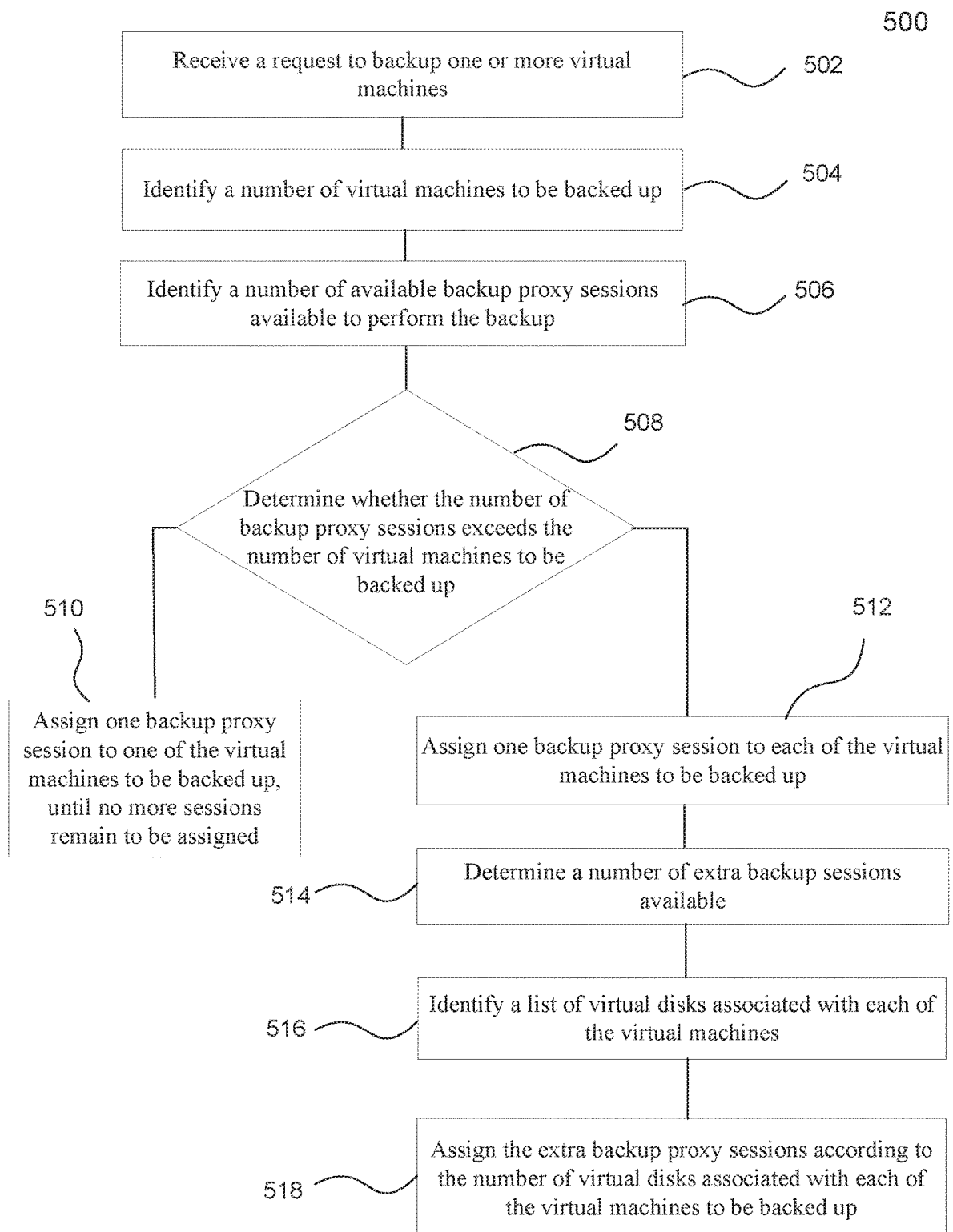
FIG. 5 is a flow diagram illustrating a method for backup according to another embodiment.

FIG. 5 is a flow diagram illustrating a data backup process according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by backup engine 106 of FIG. 1 and/or backup logic 206 of FIG. 2. Referring to FIG. 5, processing logic, at block 502, receives a request to backup one or more VMs. The backup may be an incremental backup of the VMs, or a full backup of the VMs, to protect data associated with operation of the VMs.

At block 504, processing logic identifies a number of VMs to be backed up. A backup server may query the VMM of the VMs to obtain the number of VMs to be backed up. The backup server may additionally retrieve the number of VMDKs associated with each VM and the size of the VMDKs from the VMM. In one embodiment, the backup server retrieves the information upon an indication of backup. In another embodiment, the backup server retrieves the information continuously or intermittently to maintain up to date information associated with the VMs.

At block 506, processing logic identifies a number of available backup proxy sessions available to perform the backup. A backup system may include multiple backup proxy servers (either physical or virtual). Each of the backup proxy servers may support a specified number of backup sessions. A backup session may be a process used to facilitate backup of data. The backup proxy session may be assigned to particular data, such as a VM, a VMDK, a file, a volume, etc. A backup proxy session may establish a connection between a backup storage system and the particular data to be backed up and then may facilitate the transfer of the data to the backup storage system.

At block 508, processing logic determines whether the number of backup proxy sessions exceeds the number of VMs to be backed up. At block 510, in response to determining that the number of backup proxy session not exceeding the number of VMs to be backed up, processing logic assigns one backup proxy session per VM to be backed up until no more backup proxy sessions remain to be assigned.

At block 512, in response to determining that the number of backup proxy sessions exceeds the number of VMs, processing logic assigns one backup proxy session to each of the VMs to be backed up. In one embodiment, the backup proxy sessions may be assigned to the first VMDK (e.g., the oldest/first created) of each of the VMs without regard to size of the VMDK. In another embodiment, the processing logic assigns the backup proxy sessions to the largest VMDK of each of the VMs.

At block 514, processing logic determines a number of extra backup sessions available. The extra backup sessions may be the number of sessions in excess of the number of VMs. Thus, the extra backup sessions would remain idle if only a single session were assigned to each VM. At block 516, processing logic identifies a list of virtual disks associated with each of the VMs.

At block 518, processing logic assigns the extra backup proxy sessions according to the number of virtual disks associated with each of the VMs to be backed up. In one embodiment, if the difference between the number of VMDKs of the VM with the most VMDKs and the VM with the second most VMDKs is larger than or equal to the number of extra backup proxy sessions, the processing logic may assign all the backup proxy sessions to the VM with the most VMDKs. The sessions may be assigned in descending order of VMDK size starting with the largest VMDK of the VM. In another embodiment, if the difference between the number of VMDKs of the VM with the most VMDKS and the VM with the second most VMDKS is less than the number of extra backup proxy sessions, the processing logic may iteratively assign the sessions to the largest VMDK of each of the VMs with VMDKs remaining to be assigned a backup proxy session. In another embodiment, the extra backup sessions are assigned to the largest VMDKs remaining to be assigned a session without regard to the associated VM, or the number of associated VMDKs.

Figure 6:
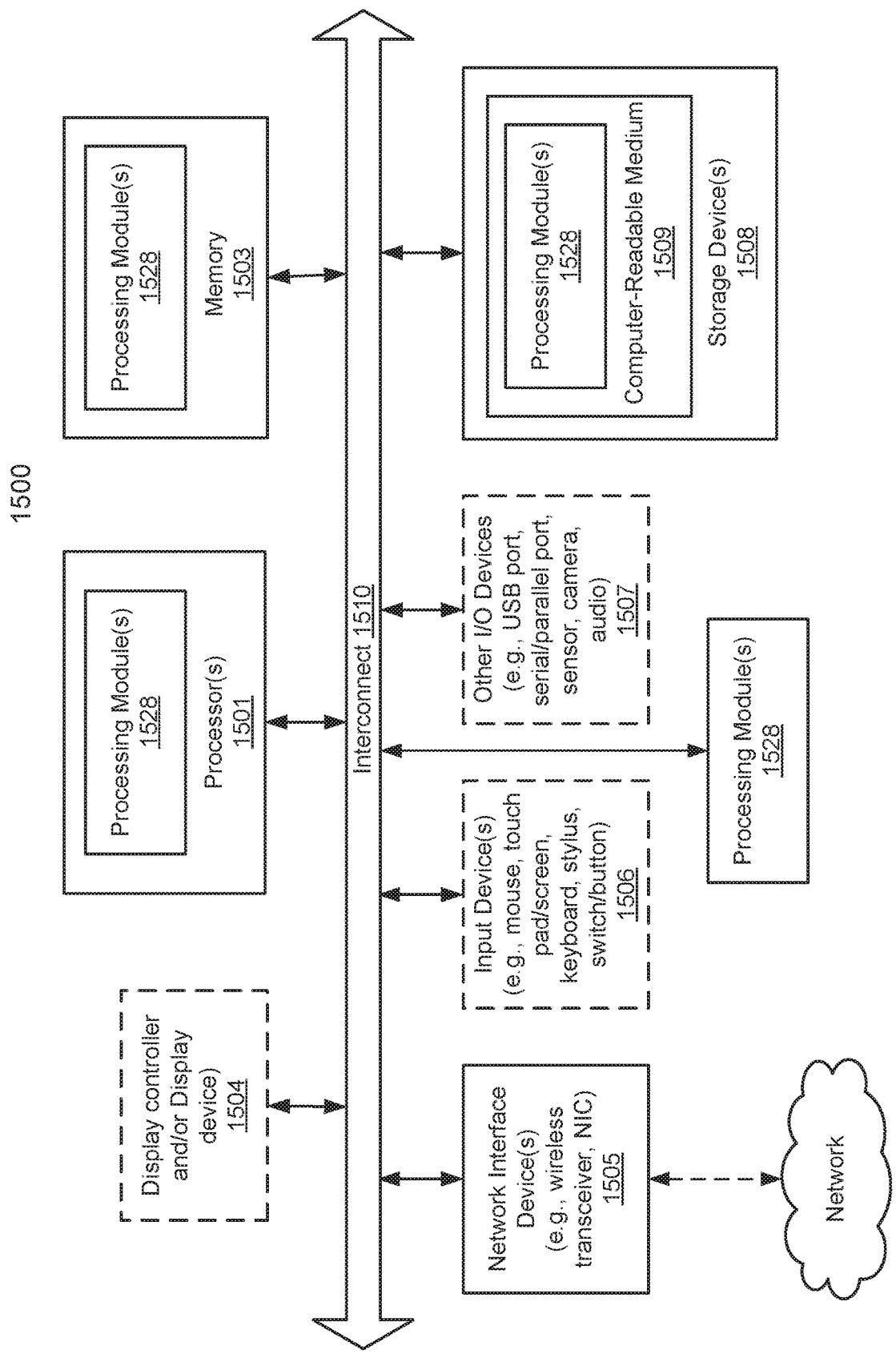
FIG. 6 is a block diagram illustrating a data processing system according to one embodiment.

FIG. 6 is a block diagram illustrating an example of a data processing system which may be used with one embodiment of the invention. For example, system 1500 may represent any of data processing systems such as clients 101-102 and/or backup application server 105, storage system 180, or backup storage system 104 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC).

Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup logic 184, or 206, backup engine 106, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing backup operations, comprising:
   receiving a request to backup one or more virtual machines to a backup storage system;
   identifying a plurality of parameters associated with the one or more virtual machines to be backed up, wherein the plurality of parameters includes a number of the one or more virtual machines to be backed up and a number of virtual disks associated with each of the one or more virtual machines requested to be backed up;
   identifying available backup proxy sessions in a backup proxy server, wherein the available backup proxy sessions are assignable backup processes in the backup proxy server in response to the request for backing up the one or more virtual machines;
   determining a number of the available backup proxy sessions in the backup proxy server exceeds the number of one or more virtual machines to be backed up;
   in response to determining the number of available backup proxy sessions exceeds the number of virtual machines to be backed up:
      assigning a different backup proxy session of the available backup proxy sessions in the backup proxy server to one virtual disk of each of the one or more virtual machines based on the plurality of parameters and the number of the available backup proxy sessions in the backup proxy server;
      determining a number of extra backup proxy sessions, wherein the number of extra backup proxy sessions is a number of available proxy sessions remaining without an assigned virtual disk after assignment of the different backup proxy session of the available backup proxy sessions in the backup proxy server to the one virtual disk of each of the one or more virtual machines;
      identifying unassigned virtual disks, wherein the number of unassigned virtual disks is a number of virtual disks associated with the one or more virtual machines remaining without an assigned backup proxy session after assignment of the different backup proxy session of the available backup proxy sessions in the backup proxy server to the one virtual disk of each of the one or more virtual machines;
      assigning the extra backup proxy sessions to the unassigned virtual disks according to the number of virtual disks associated with each of the one or more virtual machines to be backed up, wherein each of the extra backup proxy sessions is assigned to one of the unassigned virtual disks of the one or more virtual machines; and
      in response to assignment of the extra backup proxy sessions, initiating backup operations using each assigned backup proxy session and each assigned extra backup proxy session to back up a corresponding virtual disk to which it is assigned.

2. The method of claim 1, wherein the plurality of parameters comprises:
   a size associated with each of the virtual disks of the one or more virtual machines.

3. The method of claim 1, wherein assigning the extra backup proxy sessions further comprises:
   assigning the extra backup proxy sessions to one or more disks of a virtual machine of the one or more virtual machines with the largest number of virtual disks.

4. The method of claim 1, wherein assigning the extra backup proxy sessions further comprises:
   assigning a first portion of the extra backup proxy sessions to one or more virtual disks of a first virtual machine of the one or more virtual machines with the largest number of virtual disks; and
   assigning a second portion of the extra backup proxy sessions to one or more virtual disks of a second virtual machine of the one or more virtual machines with a second largest number of virtual disks.

5. The method of claim 2, wherein the extra backup proxy sessions are assigned to the unassigned virtual disks in descending order of the size of the unassigned virtual disks.

6. The method of claim 1, further comprising:
   in response to determining that a backup proxy session has become idle, reassigning the backup proxy session based on the plurality of parameters.

7. The method of claim 1, wherein identifying the unassigned virtual disks comprises generating a list of virtual machines with at least one unassigned virtual disk based on the number of virtual disks associated with each of the one or more virtual machines to be backed up, and wherein the extra backup proxy sessions are assigned to the unassigned virtual disks based on the list of virtual machines with at least one unassigned virtual disk.

8. A system comprising:
   a memory;
   a processor, coupled to the memory, to:
      receive a request to backup one or more virtual machines to a backup storage system;
      identify a plurality of parameters associated with the one or more virtual machines to be backed up, wherein the plurality of parameters includes a number of the one or more virtual machines to be backed up and a number of virtual disks associated with each of the one or more virtual machines requested to be backed up;
      identify available backup proxy sessions in a backup proxy server, wherein the available backup proxy sessions are assignable backup processes in the backup proxy server in response to the request for backing up the one or more virtual machines;
      determine a number of the available backup proxy sessions in the backup proxy server;
      determine the number of available backup proxy sessions exceeds the number of one or more virtual machines to be backed up;
      in response to determining the number of available backup proxy sessions exceeds the number of virtual machines to be backed up:
         assign a different backup proxy session of the available backup proxy sessions in the backup proxy server to one virtual disk of each of the one or more virtual machines based on the plurality of parameters and the number of the available backup proxy sessions;
         determine a number of extra backup proxy sessions, wherein the number of extra backup proxy sessions is a number of available proxy sessions remaining without an assigned virtual disk after assignment of the different backup proxy session of the available backup proxy sessions in the backup proxy server to the one virtual disk of each of the one or more virtual machines;
         identify unassigned virtual disks, wherein the number of unassigned virtual disks is a number of virtual disks associated with the one or more virtual machines remaining without an assigned backup proxy session after assignment of the different backup proxy session of the available backup proxy sessions in the backup proxy server to the one virtual disk of each of the one or more virtual machines;

assign the extra backup proxy sessions to the unassigned virtual disks according to the number of virtual disks associated with each of the one or more virtual machines to be backed up, wherein each of the extra backup proxy sessions is assigned to one of the unassigned virtual disks of the one or more virtual machines; and in response to assignment of the extra backup proxy sessions, initiate backup operations using each assigned backup proxy session and each assigned extra backup proxy session to back up a corresponding virtual disk to which it is assigned.

9. The system of claim 8, wherein the plurality of parameters comprises:

a size associated with each of the virtual disks of the one or more virtual machines.

10. The system of claim 8, wherein to assign the extra backup proxy sessions, the processor is further configured to:

assign the extra backup proxy sessions to one or more disks of a virtual machine of the one or more virtual machines with the largest number of virtual disks.

11. The system of claim 8, wherein to assign the extra backup proxy sessions, the processor is further to:

assign a first portion of the extra backup proxy sessions to one or more virtual disks of a first virtual machine of the one or more virtual machines with the largest number of virtual disks; and assign a second portion of the extra backup proxy sessions to one or more virtual disks of a second virtual machine of the one or more virtual machines with a second largest number of virtual disks.

12. The system of claim 9, wherein the extra backup proxy sessions are assigned to the unassigned virtual disks in descending order of the size of the unassigned virtual disks.

13. The system of claim 8, wherein the processor is further to:

in response to determining that a backup proxy session has become idle, reassign the backup proxy session based on the plurality of parameters.

14. The system of claim 8, wherein identifying the unassigned virtual disks comprises generating a list of virtual machines with at least one unassigned virtual disk based on the number of virtual disks associated with each of the one or more virtual machines to be backed up, and wherein the extra backup proxy sessions are assigned to the unassigned virtual disks based on the list of virtual machines with at least one unassigned virtual disk.

15. A non-transitory machine-readable medium having instructions stored therein, that when executed by a processing device, perform operations comprising:

receiving a request to backup one or more virtual machines to a backup storage system;

identifying a number of virtual machines to be backed up and a number of virtual disks associated with each of the one or more virtual machines to be backed up;

identifying available backup proxy sessions in a backup proxy server available to perform the backup, wherein the available backup proxy sessions are assignable backup processes in the backup proxy server in response to the request to back up the one or more virtual machines to the backup storage system;

determining a number of the available backup proxy sessions in the backup proxy server;

determining the number of available backup proxy sessions exceeds the number of one or more virtual machines to be backed up;

in response to determining the number of available backup proxy sessions exceeds the number of virtual machines to be backed up:

assigning a different backup proxy session of the available backup proxy sessions in the backup proxy server to one virtual disk of each of the one or more virtual machines based on the number of the available backup proxy sessions in the backup proxy server;

determining a number of extra backup proxy sessions, wherein the number of extra backup proxy sessions is a number of available proxy sessions remaining without an assigned virtual disk after assignment of the different backup proxy session of the available backup proxy sessions in the backup proxy server to the one virtual disk of each of the one or more virtual machines;

identifying unassigned virtual disks, wherein the number of unassigned virtual disks is a number of virtual disks associated with the one or more virtual machines remaining without an assigned backup proxy session after assignment of the different backup proxy session of the available backup proxy sessions in the backup proxy server to the one virtual disk of each of the one or more virtual machines assigning the extra backup proxy sessions to the unassigned virtual disks according to the number of virtual disks associated with each of the one or more virtual machines to be backed up, wherein each of the extra backup proxy sessions is assigned to one of the unassigned virtual disks; and in response to assignment of the extra backup proxy sessions, initiating backup operations using each assigned backup proxy session and each assigned extra backup proxy session to back up a corresponding virtual disk to which it is assigned.

16. The non-transitory machine-readable medium of claim 15, wherein assigning the extra backup proxy sessions comprises:

assigning the extra backup proxy sessions to one or more disks of a virtual machine of the one or more virtual machines with the largest number of virtual disks.

17. The non-transitory machine-readable medium of claim 15, wherein assigning the extra backup proxy sessions comprises:

assigning a first portion of the extra backup proxy sessions to one or more virtual disks of a first virtual machine of the one or more virtual machines with a largest number of virtual disks; and assigning a second portion of the extra backup proxy sessions to one or more virtual disks of a second virtual machine of the one or more virtual machines with a second largest number of virtual disks.

18. The non-transitory machine-readable medium of claim 15, wherein the extra backup proxy sessions are assigned to the unassigned virtual disks in descending order of a size of the unassigned virtual disks.

19. The non-transitory machine-readable medium of claim 15, wherein initiating backup operations comprises:

calculating an estimated backup time for each of the one or more virtual machines based on network speed and the assignment of the backup proxy sessions; and determining an order in which virtual machines are backed up based on the estimated backup time for each of the one or more virtual machines.

20. The non-transitory machine-readable medium of claim 15, wherein identifying the unassigned virtual disks comprises generating a list of virtual machines with at least one unassigned virtual disk based on the number of virtual disks associated with each of the one or more virtual machines to be backed up, and wherein the extra backup proxy sessions are assigned to the unassigned virtual disks based on the list of virtual machines with at least one unassigned virtual disk.

* * * * *